United States Patent
Takahashi et al.

[11] Patent Number: 5,922,483
[45] Date of Patent: Jul. 13, 1999

[54] MAGNETIC RECORDING MEDIUM

[75] Inventors: Masatoshi Takahashi; Naoto Murao; Nobuyoshi Asada; Noburo Hibino, all of Kanagawa, Japan

[73] Assignee: Fuji Photo Film Co., Ltd., Japan

[21] Appl. No.: 08/802,015

[22] Filed: Feb. 18, 1997

Related U.S. Application Data

[30] Foreign Application Priority Data

Feb. 26, 1996 [JP] Japan ................... 8-038273

[51] Int. Cl.$^6$ ........................................ G11B 5/66
[52] U.S. Cl. .................... 428/694 B; 428/694 BU; 428/694 BB; 428/694 BA; 428/694 ST; 428/694 SL; 428/900
[58] Field of Search ............... 428/694 B, 694 BU, 428/694 BB, 694 BA, 694 ST, 694 SL, 900

[56] References Cited

U.S. PATENT DOCUMENTS

| | | | |
|---|---|---|---|
| 4,316,927 | 2/1982 | Kimura | 428/216 |
| 5,055,349 | 10/1991 | Yasufuku | 428/323 |
| 5,196,265 | 3/1993 | Kyoke | 428/332 |
| 5,419,961 | 5/1995 | Kobayashi | 428/332 |
| 5,510,168 | 4/1996 | Mori | 428/141 |
| 5,525,404 | 6/1996 | Hatanaka | 428/212 |

*Primary Examiner*—Leszek Kiliman
*Attorney, Agent, or Firm*—Brinks Hofer Gilson & Lione

[57] ABSTRACT

A magnetic recording medium having a total thickness of not more than 11 μm is disclosed, comprising a non-magnetic support having a magnetic layer comprising a ferromagnetic powder dispersed in a binder provided on one surface of the non-magnetic support and a back layer provided on the other surface of the non-magnetic support, wherein the non-magnetic support has a longitudinal Young's modulus ($E_{MD}$) and a crosswise Young's modulus ($E_{TD}$) such that the sum of $E_{MD}$ and $E_{TD}$ is not less than 1,200 kg/mm² and the ratio of $E_{MD}$ to $E_{TD}$ is from 1/1 to 1/3 and an intrinsic viscosity of from 0.50 to 0.60 and the magnetic layer comprises a polyurethane resin with a weight-average molecular weight of from 30,000 to 60,000 having a component having a molecular weight of not more than 5,000 in an amount of not more than 4.5%.

11 Claims, No Drawings

MAGNETIC RECORDING MEDIUM

FIELD OF THE INVENTION

The present invention relates to a magnetic recording medium comprising a non-magnetic support, a magnetic layer and a back layer.

BACKGROUND OF THE INVENTION

A biaxially-oriented film of polyethylene terephthalate (PET) has heretofore been often used as a non-magnetic support (hereinafter also referred to as "base") for a magnetic recording medium because of its good surface flatness and mechanical properties and excellent abrasion resistance and running properties in the form of magnetic recording medium. In recent years, in the field of video tape comprising polyester as a base, demand for higher recording density and prolonged recording time is increased. This requires that the base have excellent smoothness and slip properties, a smaller thickness, a higher strength and excellent running properties.

In order to solve these problems, magnetic tape manufacturers employ a PET base which is strengthened both longitudinal and crosswise directions. However, such a PET base is disadvantageous in that as its thickness decreases, it lacks strength. Such a PET base causes deformation or damage on tape edge in a tape running system, remarkably impairing the recording and reproduction properties of the tape.

As approaches for providing a strengthened thin magnetic tape there are proposed a technique using polyaramide in JP-A-62-234233 (The term "JP-A" as used herein means an "unexamined published Japanese patent application") and a technique using polyethylene naphthalate (PEN) in EP-229346. These bases attain a high strength because these materials have a strong in-plane orientability. At the same time, this strong in-plane orientability causes a remarkably reduced tear propagation resistance. Therefore, the magnetic recording material is liable to break at coating, calendering and slitting steps, causing a drastic yield drop. Even after formed into a tape, the magnetic recording material can be extremely easily broken when damaged even slightly due to some trouble in the running system, raising great problems in product quality. JP-A-63-197643 and JP-A-63-212549 propose a technique using a composite polyester. However, such a technique is disadvantageous in that if a proper lamination ratio is not selected, the strong in-plane orientability causes a remarkable drop of tear propagation resistance or a lack of strength. Accordingly, the magnetic recording material is liable to break at coating, calendering and slitting steps, causing a drastic yield drop or deformation or damage on tape edge in a tape running system and hence remarkably impairing the recording and reproduction properties of the magnetic recording medium.

In some detail, JP-A-63-197643 proposes a three-layer composite film composed of a biaxially-oriented PET film as a core layer and a biaxially-oriented PEN film provided on the sides thereof, the thickness of said outer layers being from 1/40 to 1/5 of the total thickness of the film.

The foregoing structure is an attempt to inhibit the precipitation of an oligomer crystal that causes dropout. However, the foregoing structure is disadvantageous in that it lacks longitudinal (MD) and crosswise (TD) strength in an ordinary balance type, causing edge deformation that results in a drastic output drop.

PEN is known as a material having an extremely high strength and thus is still a material suitable for the prolongation of recording time, enhancement of recording density and miniaturization. In other words, a PEN material which can be effectively used singly as a base and a method for using such a PEN material have been desired.

However, even if a high strength base such as PEN is used, the reduction of the total thickness of the magnetic tape gives a great contribution to the drop of the tape strength. This lowers head contact pressure, deteriorating RF output and RF flatness and worsening head stain. It has thus been desired to solve these problems. However, magnetic recording media having a base satisfying these requirements have never been obtained.

The use of a high strength base is also disadvantageous in that the slittability of the magnetic tape is impaired, causing the tape to rise at its edge during slitting.

SUMMARY OF THE INVENTION

An object of the present invention is to provide a magnetic recording medium having a total thickness of not more than 11 μm which provides an excellent head contact, causes no head stain, gives a high output and exhibits an excellent RF flatness and an excellent slittability.

The foregoing object of the present invention will become more apparent from the following detailed description and examples.

The present invention relates to a magnetic recording medium having a total thickness of not more than 11 μm comprising a non-magnetic support having a magnetic layer comprising a ferromagnetic powder dispersed in a binder provided on one surface of the non-magnetic support and a back layer provided on the other surface of the non-magnetic support, wherein the non-magnetic support has a longitudinal Young's modulus ($E_{MD}$) and a crosswise Young's modulus ($E_{TD}$) such that the sum of $E_{MD}$ and $E_{TD}$ is not less than 1,200 kg/mm$^2$ and the ratio of $E_{MD}$ to $E_{TD}$ is from 1/1 to 1/3 and an intrinsic viscosity of from 0.50 to 0.60 and said magnetic layer comprises a polyurethane resin with a weight-average molecular weight of from 30,000 to 60,000 having a component having a molecular weight of not more than 5,000 in an amount of not more than 4.5%.

In the present invention, the physical properties of the base and the resin composition of the magnetic layer in a coating type magnetic recording medium having a total thickness as small as not more than 11 μm comprising a magnetic layer and a back layer are specified.

The present invention is characterized by the predetermination of the longitudinal Young's modulus ($E_{MD}$) and crosswise Young's modulus ($E_{TD}$) of the base such that the sum of $E_{MD}$ and $E_{TD}$ is not less than 1,200 kg/mm$^2$ and the ratio of $E_{MD}$ to $E_{TD}$ is from 1/1 to 1/3 and the intrinsic viscosity of the base to from 0.50 to 0.60 and the use of a polyurethane resin with a weight-average molecular weight of from 30,000 to 60,000 having a component having a molecular weight of not more than 5,000 in an amount of not more than 4.5% (by weight) as a resin constituting the magnetic layer.

The present invention is characterized in that even if a base which has been enhanced in its crosswise tension is used, a good slittability can be obtained and no staining components are given. In other words, in the prior art, the deteriorated head contact caused by the use of a thin base has been made up for by the use of a base having an enhanced stiffness obtained by raising its crosswise tension. However, this gives a disadvantage that the base has a deteriorated slittability.

The present invention has been worked out on the basis of the knowledge that the slittability of a base can be drastically enhanced by predetermining the intrinsic viscosity of the base to the above defined range.

The prior art thin magnetic recording medium is generally disadvantageous in that it shows an abrasion drop that causes a drop of self-cleaning power, resulting in the rise of head stain. The present invention has been worked out on the presumption that the components of the head stain causes the occurrence of low molecular components in the binder. In particular, the stain head can be drastically minimized by predetermining the content of low molecular components in the polyurethane resin as a resin component to the above defined range.

In general, taking account the relationship with the weight-average molecular weight of polyurethane resin, the more the weight-average molecular weight of the polyurethane resin is, the more desirable is the thin magnetic recording medium from the standpoint of the minimization of the low molecular content. However, as the weight-average molecular weight increases, the ferromagnetic powder cannot be sufficiently dispersed in the binder, lowering the output. Further, the smaller the weight-average molecular weight of the polyurethane resin is, the more desirable is the thin magnetic recording medium from the standpoint of the dispersibility of the ferromagnetic powder. However, as the weight-average molecular weight of the polyurethane decreases, the content of low molecular components increases, causing head stain.

Thus, the present invention has been worked out on the basis of the knowledge that the foregoing problems can be solved by predetermining the weight-average molecular weight of the polyurethane resin to a range of from 30,000 to 60,000, particularly from 35,000 to 50,000. If the intrinsic viscosity of the base deviates from the above defined range, the resulting base exhibits a deteriorated slittability, durability, output or RF flatness. Further, if the content of low molecular components in the polyurethane resin deviates from the above defined range, it causes head stain and deteriorates the slittability.

In the present invention, a base which exhibits $E_{MD}$ and $E_{TD}$ such that the sum of $E_{MD}$ and $E_{TD}$ is not less than 1,200 kg/mm$^2$ and the ratio of $E_{MD}$ to $E_{TD}$ is from 1/1 to 1/3 contributes to the improvement of head contact. If the sum ($E_{MD}+E_{TD}$) falls below 1,200 kg/mm$^2$, the resulting magnetic recording medium exhibits a reduced output and deteriorated RF flatness and durability even when the ratio ($E_{MD}/E_{TD}$) falls within the range of from 1/1 to 1/3. If the ratio ($E_{MD}/E_{TD}$) exceeds 1/1, the resulting magnetic recording medium exhibits a reduced output and a deteriorated RF flatness even when Young's modulus is not less than 1,200 kg/mm$^2$. If the ratio ($E_{MD}/E_{TD}$) falls below 1/3, the resulting magnetic recording medium exhibits a high output but a deteriorated RF flatness.

Even if the foregoing requirements for the sum ($E_{MD}+E_{TD}$) and ratio ($E_{MD}/E_{TD}$) are satisfied, when the intrinsic viscosity of the base and the properties of the polyurethane resin in the foregoing magnetic layer deviate from the above defined range, the resulting magnetic recording medium rises at the edge thereof during slitting and thus shows a deteriorated windability after slitting. The use of a base having an intrinsic viscosity of from 0.50 to 0.60 and a polyurethane resin comprising components having a molecular weight of not more than 5,000 in an amount of not more than 4.5% can inhibit the edge rise of the magnetic recording medium and head stain and provide a good durability. If the intrinsic viscosity of the base exceeds 0.6 or the content of components having a molecular weight of not more than 5,000 exceeds 4.5%, the edge rise of the magnetic recording medium cannot be inhibited. If the intrinsic viscosity of the base falls below 0.50, the base exhibits a reduced strength that deteriorates the durability thereof.

If the total thickness of the magnetic recording medium is not more than 11 μm, a self-cleaning effect of the magnetic recording medium is decreased to increase a herd stain. However, the head stain can be inhibited by use of a polyurethane resin with a weight-average molecular weight of from 30,000 to 60,000 comprising components having a molecular weight of not more than 5,000 in an amount of not more than 4.5%. If the polyurethane resin comprises components having a molecular weight of not more than 5,000 in an amount of greater than 4.5%, head stain cannot be inhibited. If the polyurethane resin has a weight-average molecular weight of not more than 30,000, its effect of inhibiting head stain cannot be achieved even when it comprises components having a molecular weight of not more than 5,000 in an amount of not more than 4.5%. If the polyurethane resin has a weight-average molecular weight of greater than 60,000, it exhibits a deteriorated dispersibility that lowers the output.

The base to be used herein exhibits $E_{MD}$ and $E_{TD}$ such that the sum ($E_{MD}+E_{TD}$) is not less than 1,200 kg/mm$^2$, preferably from 1,300 to 2,000 kg/mm$^2$, more preferably from 1,400 to 2,000 kg/mm$^2$, most preferably from 1,400 to 1,700 kg/mm$^2$.

In the present invention, $E_{TD}$ and $E_{MD}$ are measured as follows. In some detail, ½ inch wide and 10 cm long crosswise and longitudinal specimens are cut from the base. These specimens are pulled at a rate of 10 cm/sec. to prepare SS (Stress-Strain) curve from which Young's modulus at an elongation of 0.5% is determined.

In the present invention, the intrinsic viscosity of the base is from 0.50 to 0.60, preferably from 0.51 to 0.58, more preferably from 0.52 to 0.55. The intrinsic viscosity of the base is measured by the method described below.

1.0 g of the polymer is dissolved in 100 ml of a 50/50 (by weight) mixture of phenol and tetrachloroethane. The solution thus obtained is then measured for intrinsic viscosity at 30° C.

In the present invention, the polyurethane resin to be incorporated in the magnetic layer comprises components having a molecular weight of not more than 5,000 in an amount of not more than 4.5% and has a weight-average molecular weight of from 30,000 to 60,000. The proportion of the low molecular components is preferably not more than 4.3%, more preferably not more than 4.0% based on the weight of the polyurethane resin. The weight-average molecular weight of the polyurethane resin is preferably from 35,000 to 55,000, more preferably from 40,000 to 50,000.

The proportion of the low molecular components in the polyurethane resin of the present invention is determined by the following method.

The magnetic recording medium is washed with hexane to remove a lubricant therefrom. The magnetic layer is dipped in THF at 60° C. to extract the sol content. The sol content is then concentrated. The sol is then measured for RI (refractive index) with THF as a solvent by means of GPC (gas permeation chromatograph available from Tosoh Corp.) From the elution curve thus obtained, the molecular weight distribution pattern is calculated in standard polystyrene equivalence. The proportion of the area corresponding to the molecular weight of not more than 5,000 is determined from the molecular weight distribution as the content of low molecular components.

The base employable herein is not specifically limited so far as it satisfies the foregoing requirements. Various synthetic resins are desirable. Specific examples of synthetic resins include polyester, polyamide, polyamideimide, polyimide, polysulfone, and polyether sulfone. Preferred among these synthetic resins is polyester. Examples of such the polyester include polyethylene naphthalate (PEN) obtained by the condensation reaction of naphthalene-2,6-dicarboxylic acid with ethylene glycol and polyethylene terephthalate (PET) obtained by the condensation reaction of terephthalic acid with ethylene glycol. Particularly preferred among these polyesters is PEN.

In the present invention, the foregoing compounds may be used singly or in combination. In the case where the same kind of compounds are used, different constituent units may be used. For example, if PEN or PET is used, as an alcohol component there may be used one other than ethylene glycol as well.

The intrinsic viscosity of the base can be adjusted by properly controlling the number-average molecular weight of the compounds constituting the base, i.e., by controlling the reaction time, reaction temperature, pressure, raw monomer concentration, catalyst, etc. during the polymerization of raw monomer.

The base of the present invention may comprise silica, calcium carbonate, magnesium carbonate or the like incorporated therein as a filler as in the prior art. The filler may be concentrated on one horizontal side of the base. In general, a polycondensate is melt-extruded through a nozzle at a high temperature, and then oriented in the longitudinal direction and crosswise direction by successive biaxial orientation method and simultaneous biaxial orientation method. An adhesive layer may be provided on one or both sides of the base film. The base film may have a smooth surface (3 to 15 nm) or rough surface (20 to 40 nm) on each side thereof.

The base film may be prepared by biaxially orienting an unoriented film. In the biaxial orientation process, if effected successively, the first stage orientation is effected at a temperature of higher than the glass transition temperature (Tg) of the base, preferably from (Tg+3) to (Tg+30)° C., subsequently followed by the second stage orientation at a temperature of from the same value as the first stage orientation temperature to 50° C. higher than the former value. The draw ratio is not less than 2, preferably not less than 2.5 at least in one direction. In other. words, the area factor is not less than 6, preferably not less than 8. The heat treatment (heat setting) is preferably effected at a temperature of from 180° C. to 230° C. under tension. It goes without saying that the upper limit of the heat treatment temperature is the highest allowable temperature at which the film can remain stable in its shape, though depending on the treatment time. The heat treatment time is preferably from several seconds to scores of second, more preferably from 3 seconds to 30 seconds. Thereafter, the film is successively oriented by a factor of from 1.05 to 5.0 in the longitudinal direction and by a factor of from 1.05 to 5.0 in the crosswise direction at a temperature of from Tg (glass transition temperature)+10 to Tm (melting temperature)–40° C. The film is preferably again subjected to heat treatment at a temperature of from Tg+50° C. to Tm–10° C.

In the present invention, the base may comprise a lubricant such as inorganic or organic inactive fine particle and organic high molecular inactive fine particle incorporated therein to improve the sliding properties thereof.

Examples of the inorganic inactive fine particle include $MgO$, $ZnO$, $MgCO_3$, $CaCO_3$, $CaSO_4$, $BaSO_4$, $Al_2O_3$, $SiO_2$, $TiO_2$, and C. Representative examples of these inorganic inactive fine particle include silica, calcium carbonate, titanium oxide, and alumina. Examples of the organic inactive fine particle include sorbitan, siroid, and catharoid. Examples of the organic high molecular inactive fine particle include tetrafluoroethylene and polyethylene fine particles.

The adjustment of the physical properties of the base to be used herein can be accomplished by controlling the orientation method or the kind and amount of the filler to be incorporated therein as mentioned above.

The structure of the polyurethane resin to be used herein is not specifically limited so far as it satisfies the foregoing requirements. Specific examples of the polyurethane resin include aliphatic polyester, aromatic polyester, mixture thereof, and polyurethane resin obtained by the polymerization of polycaprolactone or polycarbonate-polyol in the presence of diisocyanate as a chain extender. Preferably, these polyurethane resins comprise a polar group such as —$SO_3M$, —$OSO_2M$, —$OSO_3M$, —COOM, —$OPO(OM)_2$ and —$PO(OM)_2$ (in which M represents H, Li, Na, K, ammonium or alkyl group) incorporated therein in an amount of from $1\times10^{-6}$ to $1\times10^{-3}$ eq/g, more preferably from $1\times10^{-5}$ to $2\times10^{-3}$ eq/g.

The polyurethane resin thus synthesized may be used without any problem so far as it satisfies the requirements of the present invention, that is, it has low molecular components having a molecular weight of not more than 5,000 in an amount of not more than 4.5% and a weight-average molecular weight of from 30,000 to 60,000. In general, the polyurethane resin obtained by the foregoing synthesis contains low molecular components more than mentioned above. Examples of the method for removing these low molecular components include a method which comprises (1) a step of dissolving the polyurethane resin thus synthesized in an organic solvent capable of dissolving the polyurethane resin to prepare a resin solution, and (2) a step of adding to the resin solution an organic solvent which can dissolve the low molecular components of the resin therein but cannot dissolve the high molecular components therein to cause the precipitation of the high molecular components which are then withdrawn.

The degree of removal of low molecular components can be adjusted by properly controlling the kind and amount of the various organic solvents to be used in the foregoing steps (1) and (2). Examples of the organic solvent to be used in the step (1) include methyl ethyl ketone, toluene, dimethylformamide, cyclohexanone, methyl isobutyl ketone, tetrahydrofuran, and ethyl acetate. Examples of the organic solvent to be used in the step (2) include hexane, methanol, ethanol, and acetone. These organic solvents may be used singly or in admixture.

In the magnetic layer of the present invention, the foregoing polyurethane resin is normally used in an amount of from 10 to 80% by weight, preferably from 15 to 50% by weight based on the total weight of binders (including hardener).

The layer structure of the magnetic recording medium of the present invention is not specifically limited so far as it comprises a magnetic layer provided on one side thereof and a back layer provided on the other side thereof. For example, a non-magnetic layer may be provided interposed between the magnetic layer and the base. Alternatively, an undercoating layer may be provided interposed between the magnetic layer and the non-magnetic layer or between the back layer and the base. Further, the magnetic layer or back layer may have a multi-layer structure.

In the present invention, the thickness of the magnetic layer is not specifically limited. It is normally from 0.05 to 5.0 μm, preferably from 0.1 to 3.5 μm. The thickness of the back layer is normally from 0.3 to 1.0 μm, preferably from 0.4 to 0.7 μm. The thickness of the base is normally from 4 to 10 μm, preferably from 5 to 8 μm. The total thickness of the magnetic recording medium is not more than 11 μm, preferably from 7 to 11 μm, more preferably from 9 to 11 μm.

The magnetic layer of the present invention comprises a ferromagnetic powder, a binder for dispersing the ferromagnetic powder therein, and optionally various additives. Examples of the additives include carbon black, abrasive, dispersing agent (or aid), lubricant, mildewproofing agent, antistatic agent, and oxidation inhibitor. The back layer and magnetic layer may comprise basically the same compositions of binder and additives. However, it is important that the kind and amount of these binders and additives be properly selected from magnetic layer to back layer. The particle size, shape, etc. of various non-magnetic powders such as carbon black and alumina, if incorporated in the magnetic layer and back layer, can be important factors and thus may be properly selected.

In the present invention, the foregoing polyurethane resin may be also incorporated in the back layer if necessary. The magnetic layer and/or back layer may comprise the following well-known thermoplastic resins, thermosetting resins, reactive resins and mixture thereof incorporated therein besides the foregoing polyurethane resin.

As the thermoplastic resin there may be used one having a softening temperature of not higher than 150° C., an average molecular weight of from 10,000 to 300,000 and a polymerization degree of from about 50 to 1,000. Examples of such a thermoplastic resin include vinyl chloride-vinyl acetate copolymer, vinyl chloride-vinylidene chloride copolymer, vinyl chloride-acrylonitrile copolymer, acrylic ester-acrylonitrile copolymer, acrylic ester-vinylidene chloride copolymer, acrylic ester-styrene copolymer, methacrylic ester-acrylonitrile copolymer, methacrylic ester-vinylidene chloride copolymer, methacrylic ester-styrene copolymer, urethane elastomer, nylon-silicone resin, nitrocellulose-polyamide resin, polyvinyl fluoride, vinylidene chloride-acrylonitrile copolymer, butadiene-acrylonitrile copolymer, polyamide resin, polyvinyl butyral, cellulose derivative (e.g., cellulose acetate butyrate, cellulose diacetate, cellulose triacetate, cellulose propionate, nitrocellulose), styrene-butadiene copolymer, polyester resin, chlorovinyl ether-acrylic ester copolymer, amino resin, various synthetic rubber thermoplastic resins, and mixture thereof.

The use of a resin having in its side chain a polar group selected from the group consisting of polar groups represented by the following formulae —$SO_3M$, —$OSO_2M$, —$OSO_3M$—, —COOM, —$OPO(OM)_2$ and —$PO(OM)_2$ (in which M represents H, Li, Na, K or the like), particularly vinyl chloride copolymer, as a preferred thermoplastic resin can exhibit an remarkable effect.

The thermosetting resin or reactive resin to be used herein has a molecular weight of not more than 200,000 in the form of coating solution. When the thermosetting resin or reactive resin which has been applied and dried is heated, it undergoes reaction such as condensation and addition to have an infinite molecular weight. Preferred among these resins is one which doesn't soften or melt until it undergoes thermal decomposition. Specific examples of such a resin include phenol resin, epoxy resin, polyurethane resin, urea resin, melamine resin, alkyd resin, silicone resin, acrylic reactive resin, epoxy-polyamide resin, nitrocellulose melamine resin, mixture of high molecular polyester resin and isocyanate prepolymer, mixture of methacrylate copolymer and diisocyanate prepolymer, mixture of polyester polyol and polyisocyanate, urea formaldehyde resin, mixture of low molecular glycol, high molecular diol and triphenylmethane triisocyanate, polyamine resin, and mixture thereof.

These binders may be used singly or in combination.

The magnetic layer may comprise additives incorporated therein besides ferromagnetic powder and binder. Referring to the mixing ratio of ferromagnetic powder and binder, the proportion of binder is from 5 to 300 parts by weight, preferably from 10 to 100 parts by weight based on 100 parts by weight of ferromagnetic powder. The back layer, too, may comprise a non-magnetic powder such as carbon black incorporated therein as necessary. The amount of the non-magnetic powder to be incorporated in the back layer is normally from 30 to 200 parts by weight, preferably from 50 to 100 parts by weight based on 100 parts by weight of the binder used.

The magnetic layer and/or back layer of the present invention may comprise a hardener incorporated therein. As such the hardener there may be used a polyisocyanate. Examples of the polyisocyanate employable herein include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, reaction product of these isocyanates with polyalcohols, and polyisocyanates produced by the condensation of isocyanates. Examples of the trade name of these commercially available polyisocyanates include Coronate L, Coronate HL, Coronate 2030, Coronate 2031, Millionate MR, Millionate MTL (available from Nippon Polyurethane Co., Ltd.), Takenate D-102, Takenate D-110N, Takenate D-200, Takenate D-202 (available from Takeda Chemical Industries, Ltd.), Desmodur L, Desmodur IL, Desmodur N and Desmodur HL (available from Sumitomo Bayer Co., Ltd.). These polyisocyanates may be used singly. Alternatively, these polyisocyanates may be used in combination to make the best use of the difference in hardening reactivity between them.

The ferromagnetic powder to be used in the present invention is not specifically limited. Preferably, a ferromagnetic metal powder containing iron, cobalt or nickel having a specific surface area (specific surface area SBET determined by BET method) of from 40 $m^2$/g to 80 $m^2$/g is used. If the specific surface area of the ferromagnetic metal powder is smaller than 40 $m^2$/g, a magnetic recording medium having desired high electromagnetic characteristics can hardly be obtained. If the specific surface area of the ferromagnetic metal powder is greater than 80 $m^2$/g, the resulting ferromagnetic powder has a poor dispersibility.

An example of the ferromagnetic metal powder is an alloy having a metal content of not less than 75% by weight, not less than 80% by weight of said metal content comprising at least one ferromagnetic metal or alloy (e.g., Fe, Co, Ni, Fe—Al, Fe—Co, Fe—Ni, Co—Ni, Co—Ni—Fe) and not more than 20% by weight of said metal content comprising other components (e.g., Al, Si, S, Sc, Ti, V, Cr, Mn, Cu; Zn, Y, Mo, Rh, Pd, Ag, Sn, Sb, Te, Ba, Ta, W, Re, Au, Hg, Pb, Bi, La, Ce, Pr, Nd, B, P). The foregoing ferromagnetic metal content may contain a small amount of water, hydroxide or oxide. Processes for the preparation of such a ferromagnetic metal powder are already known. The ferromagnetic metal powder to be used in the present invention can be prepared by these well-known processes.

Examples of process for the preparation of ferromagnetic metal powder include the following processes:

(a) Process which comprises the reduction of a composite organic acid salt (mainly oxalate) with a reducing gas such as hydrogen;

(b) Process which comprises the reduction of iron oxide with a reducing gas such as hydrogen to obtain particulate Fe or Fe—Co;

(c) Process which comprises the thermal decomposition of a metallic carbonyl compound;

(d) Process which comprises adding a reducing agent such as sodium borohydride, hypophosphite and hydrazine to an aqueous solution of ferromagnetic metal to reduce the ferromagnetic metal;

(e) Process which comprises electrodepositing a ferromagnetic metal powder on a mercury cathode, and then separating the ferromagnetic metal powder from mercury; and (f) Process which comprises evaporating a metal in an inert gas to obtain a particulate metal The shape of the ferromagnetic metal powder is not specifically limited. In general, acicular, granular, cubic, ellipsoidal or tabular ferromagnetic metal powder may be used.

As the ferromagnetic powder to be used in the present invention there may be used tabular hexagonal barium ferrite. Referring to the particle size of the barium ferrite, the diameter is from about 0.001 to 1 $\mu$m and the thickness is from ½ to ½0 of the diameter. The specific gravity of the barium ferrite is from 4 to 6 g/ml. The specific surface area of the barium ferrite is from 1 m$^2$/g to 70 m$^2$/g.

If necessary, FeO$_x$ (X=1.33 to 1.50), Co-containing FeO$_x$, etc. may be used.

As the non-magnetic powder to be incorporated in the back layer of the present invention there may be used any of various powders disclosed in JP-A-59-110038. Specific examples of these powders include carbon black, graphite, tungsten disulfide, boron nitride, silicon dioxide, calcium carbonate, aluminum oxide, iron oxide, titanium dioxide, magnesium oxide, zinc oxide, calcium oxide, lithophone, talc, and stannic oxide.

These non-magnetic powders normally have an average particle diameter of from 0.005 to 5.0 $\mu$m, preferably from 0.010 to 2.0 $\mu$m.

These ferromagnetic powders or non-magnetic powders may be dipped in a solvent of dispersant, lubricant or antistatic agent described later prior to dispersion for various purposes so that these additives are adsorbed by the surface of the powders.

Examples of the dispersant employable herein include an aliphatic acid having 10 to 20 carbon atoms (R$_1$COOH in which R$_1$ is an alkyl group having 9 to 21 carbon atoms) such as caprylic acid, capric acid, lauric acid, myristic acid, palmitic acid, stearic acid, oleic acid, elaidic acid, linoleic acid, linolenic acid and stearolic acid, metal soap made of the foregoing aliphatic acid with an alkaline metal (e.g., Li, Na, K), alkaline earth metal (e.g., Mg, Ca, Ba), Cu, Pd or the like, and lecithin. Other examples of the dispersant employable herein include higher alcohol having 10 or more carbon atoms, and sulfuric ester and phosphoric ester thereof. Such a dispersant may be added in an amount of from 0.05 to 20 parts by weight based on 100 parts by weight of the binder used. The dispersant may be previously coated by the surface of ferromagnetic powder or non-magnetic powder or may be added during dispersion as disclosed in JP-B-39-28369 (The term "JP-B" as used herein means an "examined Japanese patent publication"), JP-B-44-17945, JP-B-48-15001, U.S. Pat. Nos. 3,387,993 and 3,470,021.

Examples of the lubricant employable herein include silicone oil, graphite, molybdenum disulfide, boron nitride, graphite fluoride, fluoroalcohol, polyolefin (e.g., polyethylene wax), polyglycol (e.g., polyethylene oxide wax), alkyl phosphate, polyphenyl ether, tungsten disulfide, aliphatic ester made of a monobasic aliphatic acid having 10 to 20 carbon atoms and one or more of a monovalent or divalent alcohol, trivalent alcohol, tetravalent alcohol and hexavalent alcohol having 3 to 12 carbon atoms, and aliphatic ester made of a monobasic aliphatic acid having 10 or more carbon atoms and a monovalent to hexavalent alcohol having 11 to 28 carbon atoms together with the number of carbon atoms in the aliphatic acid. Other examples of the lubricant employable herein include an aliphatic acid having 8 to 22 carbon atoms or aliphatic acid amide, and aliphatic alcohol. Specific examples of these organic compound lubricants include butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, oleyl alcohol, and lauryl alcohol. As the lubricant to be used in the present invention there may be used a so-called lubricant additive alone. Examples of such a lubricant additive include oxidation inhibitor (e.g., alkylphenol), rust preventive (e.g., naphthenic acid, alkenylsuccinic acid, dilauryl phosphate), oily agent (e.g., colza oil, lauryl alcohol), extreme pressure additive (e.g., dibenzyl sulfide, tricresyl phosphate, tributyl phosphite), detergent-dispersant, viscosity index improver, pour point depressant, and anti-foaming agent. Such a lubricant is added in an amount of from 0.05 to 20 parts by weight based on 100 parts by weight of the binder used.

Examples of the antistatic agent employable herein include electrically-conductive powder such as graphite, carbon black and carbon black graft polymer; natural surface active agent such as saponin; nonionic surface active agent such as alkylene oxide, glycerin, glycidol, polyvalent alcohol, polyvalent alcohol ester and alkylphenol-EO adduct; cationic surface active agent such as higher alkylamine, cyclic amine, hydantoin derivative, amide amine, ester amide, quaternary ammonium salt, pyridine, other heterocyclic compounds, phosphonium and sulfonium; anionic surface active agent containing acidic group such as carboxylic acid, sulfone, phosphoric acid, sulfuric acid ester and phosphoric acid ester; and amphoteric surface active agent such as amino acid, aminosulfonic acid, sulfuric or phosphoric acid ester of amino alcohol; and alkylbetaine.

These surface active agents may be added singly or in admixture. These surface active agents are used as antistatic agents. However, these surface active agents may be often used for other purposes such as improvement of dispersion properties, magnetic characteristics and lubricating properties or as coating aid.

Examples of carbon black employable herein include furnace black for rubber, thermal black for rubber, coloring black, and acetylene black. Specific examples of the abbreviation of these carbon blacks in U.S. include SAF, ISAF, IISAF, T, HAF, SPF, FF, FEF, HMF, GPF, APF, SRF, MPF, ECF, SCF, CF, FT, MT, HCC, HCF, MCF, LFF, and RCF. That is, carbon blacks classified as D-1765-82a in ASTM of U.S. can be used. The carbon black to be used in the present invention has an average particle size of from 10 to 1,000 $\mu$m (as determined by electron microscope), a specific surface area of from 1 to 800 m$^2$/g as determined by nitrogen adsorption method, a pH value of from 6 to 11 (JIS K-6221-1982) and a DBP oil absorption of from 10 to 400 ml/100 g (JIS K-6221-1982). The size of carbon black to be used in the present invention is from 10 to 100 m$\mu$ when it is used for the purpose of lowering the surface electrical resistance of the coating layer (magnetic layer and back layer) or from 50 to 1,000 m$\mu$ when it is used to control the strength of the coating layer. Further, finer carbon black (having a size of 100 m$\mu$ or less) is used to smoothen the surface of the coating layer and hence reduce the spacing loss for the purpose of controlling the surface roughness of the coating layer. For the purpose of roughening the surface of the coating layer to lower the abrasion coefficient thereof, coarse carbon black (size: not less than 50 m$\mu$) is used. Thus, the kind and amount of carbon black to be used may be selected depending on the purpose. The carbon black may be subjected to surface treatment with a dispersant described later or may be grafted with a resin. During its preparation, the carbon black may be treated at a furnace temperature of not lower than 2,000° C. so that it is partly graphited on the surface thereof. As a special carbon black there may be used hollow carbon black. Such the carbon black, if incorporated in the magnetic layer, is preferably used in an amount of from 0.1 to 20 parts by weight based on 100 parts by weight of the ferromagnetic powder. For the details of carbon black to be used in the present invention, reference can be made to "Handbook of Carbon Black", Society of Carbon Black, 1971.

As the organic solvents to be used in the dispersion, kneading and coating steps there may be used in any proportion a ketone such as acetone, methyl ethyl ketone, methyl isobutyl ketone, cyclohexanone, isophorone and tetrahydrofuran; an alcohol such as methanol, ethanol, propanol, butanol, isobutyl alcohol, isopropyl alcohol and methyl cyclohexanol; an ester such as methyl acetate, ethyl acetate, butyl acetate, isobutyl acetate, isopropyl acetate, ethyl lactate, glycol acetate and monoethyl ether; a glycol ether such as ether, glycol dimethyl ether, glycol monoethyl ether and dioxane; a tar (aromatic hydrocarbon) such as benzene, toluene, xylene, cresol, chlorobenzene and styrene; a chlorinated hydrocarbon such as methylene chloride, ethylene chloride, carbon tetrachloride, chloroform, ethylene chlorohydrin and dichlorobenzene; N,N-dimethylformaldehyde; hexane; etc.

The kneading method is not specifically limited. The order of addition of the various components may be properly selected. The preparation of the magnetic coating solution and back layer coating solution can be accomplished by means of an ordinary kneader such as two-roll mill, three-roll mill, ball mill, pebble mill, Trommel mill, sand grinder, Szegvari, attritor, high speed impeller, high speed stone mill, high speed impact mill, disper, kneader, high speed mixer, ribbon blender, cokneader, intensive mixer, tumbler, blender, disperser, homogenizer, single-screw extruder, twin-screw extruder and ultrasonic dispersing machine. For the details of technique for kneading and dispersion, reference can be made to T. C. Patton, *"Paint Flow and Pigment Dispersion"*, 1964, John Wiley & Sons and Shinichi Tanaka, "Kogyo Zairyo (Industrial Materials)", vol. 25, No. 37, 1977. Reference can also be made to U.S. Pat. Nos. 2,581,414 and 2,855,156. In the present invention, kneading and dispersion can be effected in accordance with any of the methods described in these references to prepare the magnetic coating solution and back layer coating solution.

The formation of the magnetic layer can be accomplished by a process which comprises dissolving the foregoing components, etc. in an organic solvent in any combination, applying the coating solution to the base, and then drying the coating solution.

The base may be subjected to corona discharge treatment, plasma treatment, undercoating treatment, heat treatment, dust-proofing treatment, metal-depositing treatment, alkali treatment or the like prior to coating.

For the application of the foregoing magnetic layer and back layer to the base, air doctor coating method, blade coating method, air knife coating method, squeeze coating method, dip coating method, reverse roll coating method, transfer roll coating method, gravure coating method, kiss coating method, cast coating method, spray coating method or the like can be employed. Other coating methods can be employed. For the details of these coating methods, reference can be made to "Coating Engineering", Asakura Shoten, pp. 253–277, Mar. 20, 1971.

The order of application of these coating solutions can be arbitrarily selected. The base may be subjected to corona discharge treatment prior to the application of desired coating solutions to enhance the adhesion between the base or undercoating layer and these coating solutions. If it is desired to compose the magnetic layer or back layer of a plurality of layers, simultaneous multi-layer coating method, successive multi-layer coating method, etc. may be effected. For the details of these multi-layer coating methods, reference can be made to JP-A-57-123532 and JP-B-62-37451.

The magnetic layer which has been applied to the base is then optionally subjected to orientation while the ferromagnetic powder incorporated therein being immediately dried. The magnetic layer thus treated is then dried. During this procedure, the base is normally carried at a rate of from 10 m/min. to 500 m/min. The drying temperature is controlled to a range of from 20° C. to 120° C. The coated layer is then optionally subjected to surface smoothening such as calendering or cut into desired shapes to prepare the magnetic recording medium of the present invention.

EXAMPLE

The present invention will be further described in the following examples, but the present invention should not be construed as being limited thereto. The "parts" as used hereinafter are "parts by weight".

Examples 1-1 to 1-15: Comparative Examples 1-1 to 1-10

[Magnetic Layer Composition 1]

100 parts of a ferromagnetic metal powder, Fe having "Co/Fe=22 atm %, Al/Fe=11 atm % and Y/Fe=2 atm %" (Hc: 1,750 Oe; $\sigma_s$: 140 emu/g; average long axis length: 0.08 $\mu$m; specific surface area: 55 m$^2$/g) were ground by means of an open kneader for 10 minutes. To the ferromagnetic metal powder thus ground were then added the following components:

| | |
|---|---|
| Vinyl chloride resin ("MR-110", available from Nippon Zeon Co., Ltd.) | 10 parts |
| Polyurethane resin (shown in Table 1) | 5 parts |
| Carbon black (particle diameter: 30 nm) | 1 part |
| MEK | 30 parts |
| Cyclohexanone | 20 parts |

The mixture was then kneaded for 60 minutes. To the mixture were then added the following components:

| | |
|---|---|
| Abrasive paste 1 (Al$_2$O$_3$ and MR-110/ mixture (6:4) of MEK and cyclohexanone; particle diameter of Al$_2$O$_3$: 0.18 $\mu$m; Al$_2$O$_3$ concentration: 50 wt %, MR-110 concentration: 5 wt % of the paste) | 28 parts |
| MEK | 200 parts |

The mixture was then subjected to dispersion by means of a sand mill for 120 minutes. To the mixture were then added the following components:

| Polyisocyanate ("Coronate L3041", available from Nippon Polyurethane Co., Ltd.) | 1 part |
|---|---|
| Stearic acid | 1 part |
| Amide stearate | 1 part |
| Butyl stearate | 1 part |
| MEK | 30 parts |

The mixture was then stirred for 20 minutes. The mixture was then filtered through a filter having an average pore diameter of 1 μm to prepare a magnetic coating solution. The magnetic coating solution thus obtained was then applied to the surface of a base having a thickness of 7 μm shown in Table 1 to obtain a dry thickness of 2.5 μm. To the other surface of the base was then applied the following back layer solution to obtain a thickness of 0.6 μm. The coating solution was then dried to form a back layer. The base to which the magnetic coating solution had been applied was oriented in a magnetic field with a magnet having 3,000 G while the magnetic coating solution was undried, dried, subjected to 5-step calendering treatment by a combination of metal rolls and plastic rolls (at a rate of 100 m/min., a linear pressure of 300 kg/cm and a temperature of 90° C.), and then slit into ½ inch wide strips at a rate of 400 m/min. to obtain a video tape.

[Composition of Back Layer Solution]

| Carbon black A (particle diameter: 18 nm) | 10 parts |
|---|---|
| Carbon black B (particle diameter: 200 nm) | 1 part |
| Nitrocellulose ("HIG1/2", available from Asahi Chemical Industry Co., Ltd.) | 6 parts |
| Polyurethane ("N-2301", available from Nippon Polyurethane Co., Ltd,.) | 60 parts |
| Polyisocyanate ("Coronate L", available from Nippon Polyurethane Co., Ltd.) | 20 parts |
| MEK | 1,000 parts |
| Toluene | 1,000 parts |

Examples 2-1 to 2-15: Comparative Examples 2-1 to 2-10

[Magnetic Layer Composition 2]

100 parts of a ferromagnetic metal powder, Fe having "Co/Fe=25 atm %, Al/Fe=8 atm % and Y/Fe=1 atm % (Hc: 2,000 Oe; $\sigma_s$: 150 emu/g; average long axis length: 0.06 μm; specific surface area: 60 m²/g) were ground by means of an open kneader for 10 minutes. To the ferromagnetic metal powder thus ground were then added the following components:

| Vinyl chloride resin ("MR-110", available from Nippon Zeon Co., Ltd.) | 10 parts |
|---|---|
| Polyurethane resin (shown in Table 2) | 5 parts |
| Carbon black (particle diameter: 80 nm) | 1 part |
| MEK | 30 parts |
| Cyclohexanone | 20 parts |

The mixture was then kneaded for 60 minutes. To the mixture were then added the following components:

| Abrasive paste 1 (Al$_2$O$_3$ and MR-110/ mixture (6:4) of MEK and cyclohexanone; particle diameter of Al$_2$O$_3$: 0.18 μm; Al$_2$O$_3$ concentration: 50 wt %, MR-110 concentration: 5 wt % of the paste) | 28 parts |
|---|---|
| Abrasive paste 2 (Cr$_2$O$_3$ and MR-110/ mixture (6:4) of MEK and cyclohexanone; particle diameter of Cr$_2$O$_3$: 0.4 μm; Cr$_2$O$_3$ concentration: 50 wt %, MR-110 concentration: 5 wt % of the paste) | 2 parts |
| MEK | 200 parts |

The mixture was then subjected to dispersion by means of a sand mill for 120 minutes. To the mixture were then added the following components:

| Polyisocyanate ("Coronate L3041", available from Nippon Polyurethane Co., Ltd.) | 1 part |
|---|---|
| Stearic acid | 1 part |
| Amide stearate | 1 part |
| 2-Ethylhexyl stearate | 1 part |
| MEK | 30 parts |

The mixture was then stirred for 20 minutes. The mixture was then filtered through a filter having an average pore diameter of 1 μm to prepare a magnetic coating solution. The magnetic coating solution thus obtained was then applied to the surface of a base having a thickness of 7 μm shown in Table 2 to obtain a dry thickness of 2.5 μm. To the other surface of the base was then applied the foregoing back layer solution to obtain a thickness of 0.6 μm. The coating solution was then dried. The base to which the magnetic coating solution had been applied was oriented in a magnetic field with a magnet having 3,000 G while the magnetic coating was undried, dried, subjected to 5-step calendering treatment by a combination of metal rolls and plastic rolls (at a rate of 100 m/min., a linear pressure of 300 kg/cm and a temperature of 90° C.), and then slit into ½ inch wide strips at a rate of 400 m/min. to obtain a video tape.

Eamples 3-1 to 3–15; Comparative Examples 3-1 to 3–10

[Magnetic Layer Composition 3]

100 parts of a ferromagnetic metal powder, Fe having "Co/Fe=18 atm %, Al/Fe=12 atm % and Y/Fe=2 atm %" (Hc: 1,600 Oe; $\sigma_s$ : 140 emu/g; average long axis length: 0.10 μm; specific surface area: 55 m²/g) were ground by means of an open kneader for 10 minutes. To the ferromagnetic metal powder thus ground were then added the following components:

| Vinyl chloride resin ("MR-110", available from Nippon Zeon Co., Ltd.) | 10 parts |
|---|---|
| Polyurethane resin (shown in Table 3) | 5 parts |
| Carbon black (particle diameter: 80 nm) | 1 part |
| MEK | 30 parts |
| Cyclohexanone | 20 parts |

The mixture was then kneaded for 60 minutes. To the mixture were then added the following components:

| Abrasive paste 1 (Al$_2$O$_3$ and MR-110/ mixture (6:4) of MEK and cyclohexanone; | 28 parts |
|---|---|

-continued

|  |  |
|---|---|
| particle diameter of Al$_2$O$_3$: 0.18 µm;<br>Al$_2$O$_3$ concentration: 50 wt %, MR-110<br>concentration: 5 wt % of the paste) |  |
| Abrasive paste 2 (Cr$_2$O$_3$ and MR-110/<br>mixture (6:4) of MEK and cyclohexanone;<br>particle diameter of Cr$_2$O$_3$: 0.4 µm;<br>Cr$_2$O$_3$ concentration: 50 wt %, MR-110<br>concentration: 5 wt % of the paste) | 2 parts |
| MEK | 200 parts |

The mixture was then subjected to dispersion by means of a sand mill for 120 minutes. To the mixture were then added the following components:

|  |  |
|---|---|
| Polyisocyanate ("Coronate L3041",<br>available from Nippon Polyurethane<br>Co., Ltd.) | 1 part |
| Stearic acid | 1 part |
| Amide stearate | 1 part |
| Isoamyl stearate | 1 part |
| 2-Ethylhexyl stearate | 1 part |
| MEK | 30 parts |

The mixture was then stirred for 20 minutes. The mixture was then filtered through a filter having an average pore diameter of 1 µm to prepare a magnetic coating solution. The magnetic coating solution thus obtained was then applied to the surface of a base having a thickness of 7 µm shown in Table 3 to obtain a dry thickness of 2.5 µm. To the other surface of the base was then applied the foregoing back-layer solution to obtain a thickness of 0.6 µm. The coating solution was then dried. The base to which the magnetic coating solution had been applied was oriented in a magnetic field with a magnet having 3,000 G while the magnetic coating solution was undried, dried, subjected to 5-step calendering treatment by a combination of metal rolls and plastic rolls (at a rate of 100 m/min., a linear pressure of 300 kg/cm and a temperature of 90° C.), and then slit into ½ inch wide strips at a rate of 400 m/min. to obtain a video tape.

The foregoing examples and comparative examples will be briefly described hereinafter. The same base and polyurethane resin were used in these examples and comparative examples as shown in Tables 1 to 3. The characteristics of the specimens were common to the examples and comparative examples as described below.

Examples (1) Examples 1-1 to 1-6, 2-1 to 2-6 and 3-1 to 3-6 differ in the sum ($E_{MD}+E_{TD}$) (referred to as "MD+TD" in the tables).

(2) Examples 1-7 to 1-9, 2-7 to 2-9 and 3-7 to 3-9 differ in the ratio ($E_{MD}/E_{TD}$) (referred to as "MD/TD" in the tables).

(3) Examples 1-10 and 1-11, 2-10 and 2-11 and 3-10 and 3-11 differ in the intrinsic viscosity of the base.

(4) Examples 1-12 and 1-13, 2-12 and 2-13 and 3-12 and 3-13 differ in the content of components having a molecular weight of not more than 5,000 in polyurethane.

(5) Examples 1-14 and 1-15, 2-14 and 2-15 and 3-14 and 3-15 differ in the weight-average molecular weight (referred to as "molecular weight" in the tables).

Comparative Examples (1) In Comparative Examples 1-1 and 1-2, 2-1 and 2-2 and 3-1 and 3-2, the sum ($E_{MD}+E_{TD}$) is less than 1,200 kg/mm$^2$.

(2) In Comparative Examples 1-3 and 1-4, 2-3 and 2-4 and 3-3 and 3-4, the ratio ($E_{MD}/E_{TD}$) is greater than 1.

(3) In Comparative Examples 1-5 and 1-6, 2-5 and 2-6 and 3-5 and 3-6, the intrinsic viscosity of the base falls outside the range of from 0.5 to 0.6.

(4) In Comparative Examples 1-7 and 1-8, 2-7 and 2-8 and 3-7 and 3-8, the content of components having a molecular weight of not greater than 5,000 in polyurethane is greater than 4.5%.

(5) In Comparative Examples 1-9 and 1-10, 2-9 and 2-10 and 3-9 and 3-10, the weight-average molecular weight of polyurethane falls outside the range of from 30,000 to 60,000.

The foregoing specimens were evaluated as follows and the results are shown in Tables 1, 2 and 3.

Evaluation Method (1) Output

D3VTRD350 (PAL) (available from Matsushita Electric Industrial Co., Ltd.) (speed of tape relative to magnetic head: 23.9 m/sec.) was used to record a 33.5 MHz signal. The signal recorded on the tape was then reproduced. The reproduced output was then measured by a spectrum analyzer with that of a standard tape (Examples 1–6 in Table 1) as 0 dB.

(2) RF Flatness

D3VTRD350 (PAL) (available from Matsushia Electric Industrial Co., Ltd.) (speed of tape relative to magnetic head: 23.9 m/sec.) was used to record a 33.5 MHz signal. The signal recorded on the tape was then reproduced. RF envelope thus developed was then measured by a spectrum analyzer. The height (difference) from the minimum value to the maximum value on RF envelope was determined as RF flatness.

(3) Head Stain

The video tape specimen was subjected to repeated running (play-rewind) in D3VTRD350 (PAL) (available from Matsushia Electric Industrial Co., Ltd.) at 21° C. and 10% RH for 24 hours, and then evaluated for head stain in accordance with the following criteria:

5: No stain observed

4: Slight stain observed attached

3: Stain observed attached to the head at the exit portion

2: Stain observed entering in the gap of the head

1: Clogging occurs (4) Slittability

G: Slitted without any edge rise

F: Slitted without any problem, though having some edge rise

P: Edge rise prevents slitting (5) Durability

Using D3VTRD350 (PAL) (available from Matsushia Electric Industrial Co., Ltd.), the video tape specimen was subjected to 300 passes of FF-REW (fast forward-rewind). The video tape specimen was then evaluated for edge damage in accordance with the following criteria:

G: No edge damage observed

F: Some but practically acceptable edge damage observed

P: Sea weed-shaped damage observed on edge

TABLE 1

| Example No. | Young's modulus MD + TD | Young's modulus MD/TD | Intr. visc. | Kind of base | Polyurethane Content of components with M.W. ≤5,000 (%) | Polyurethane M.W. | Evaluation results Output (dB) | Evaluation results RF flatness (dB) | Evaluation results Head stain | Evaluation results Slittability | Evaluation results Durability |
|---|---|---|---|---|---|---|---|---|---|---|---|
| Example 1-1 | 1,500 | 1/1.5 | 0.54 | PEN | 4.2 | 45,000 | +0.4 | −1.5 | 4 | G | G |
| Example 1-2 | 1,660 | 1/2.0 | 0.54 | PEN | 4.2 | 45,000 | +0.5 | −1.3 | 4 | G | G |
| Example 1-3 | 1,940 | 1/2.6 | 0.54 | PEN | 4.2 | 45,000 | +0.5 | −1.1 | 4 | F | G |
| Example 1-4 | 1,400 | 1/2.0 | 0.54 | PEN | 4.2 | 45,000 | +0.4 | −1.5 | 4 | G | G |
| Example 1-5 | 1,200 | 1/2.0 | 0.54 | PEN | 4.2 | 45,000 | +0.1 | −1.6 | 4 | G | G |
| Example 1-6 | 1,250 | 1/2.0 | 0.60 | PET | 4.2 | 45,000 | 0 | −1.7 | 4 | G | G |
| Example 1-7 | 1,500 | 1/1 | 0.54 | PEN | 4.2 | 45,000 | 0 | −1.8 | 4 | G | G |
| Example 1-8 | 1,500 | 1/2.5 | 0.54 | PEN | 4.2 | 45,000 | +0.5 | −1.2 | 4 | F | G |
| Example 1-9 | 1,500 | 1/3.0 | 0.54 | PEN | 4.2 | 45,000 | +0.6 | −1.1 | 4 | F | G |
| Example 1-10 | 1,500 | 1/1.5 | 0.50 | PEN | 4.2 | 45,000 | +0.2 | −1.6 | 4 | G | F |
| Example 1-11 | 1,500 | 1/1.5 | 0.60 | PEN | 4.2 | 45,000 | +0.5 | −1.2 | 4 | F | G |
| Example 1-12 | 1,500 | 1/1.5 | 0.54 | PEN | 3.0 | 45,000 | +0.4 | −1.4 | 5 | G | G |
| Example 1-13 | 1,500 | 1/1.5 | 0.54 | PEN | 4.2 | 45,000 | +0.4 | −1.4 | 3 | G | G |
| Example 1-14 | 1,500 | 1/1.5 | 0.54 | PEN | 4.2 | 31,000 | +0.4 | −1.4 | 3 | G | G |
| Example 1-15 | 1,500 | 1/1.5 | 0.54 | PEN | 4.2 | 59,000 | +0.1 | −1.4 | 5 | G | G |
| Comparative Example 1-1 | 1,100 | 1/1.5 | 0.54 | PEN | 4.2 | 45,000 | −0.4 | −2.3 | 3 | G | F |
| Comparative Example 1-2 | 1,150 | 1/1.5 | 0.60 | PET | 4.2 | 45,000 | −0.5 | −2.2 | 3 | G | F |
| Comparative Example 1-3 | 1,500 | 2.0/1 | 0.54 | PEN | 4.2 | 45,000 | −0.6 | −2.8 | 4 | G | F |
| Comparative Example 1-4 | 1,500 | 1/3.5 | 0.54 | PEN | 4.2 | 45,000 | +0.6 | −2.5 | 4 | F | G |
| Comparative Example 1-5 | 1,500 | 1/1.5 | 0.48 | PEN | 4.2 | 45,000 | −0.2 | −2.2 | 4 | G | P |
| Comparative Example 1-6 | 1,500 | 1/1.5 | 0.65 | PEN | 4.2 | 45,000 | +0.6 | −1.3 | 4 | P | G |
| Comparative Example 1-7 | 1,500 | 1/1.5 | 0.54 | PEN | 5.0 | 45,000 | +0.4 | −1.2 | 2 | P | G |
| Comparative Example 1-8 | 1,500 | 1/1.5 | 0.54 | PEN | 6.2 | 45,000 | +0.4 | −1.3 | 1 | P | G |
| Comparative Example 1-9 | 1,500 | 1/1.5 | 0.54 | PEN | 4.2 | 28,000 | +0.6 | −1.1 | 1 | G | G |
| Comparative Example 1-10 | 1,500 | 1/1.5 | 0.54 | PEN | 4.2 | 62,000 | −0.8 | −1.3 | 5 | G | G |

TABLE 2

| Example No. | Young's modulus MD + TD | Young's modulus MD/TD | Intr. visc. | Kind of base | Polyurethane Content of components with M.W. ≤5,000 (%) | Polyurethane M.W. | Evaluation results Output (dB) | Evaluation results RF flatness (dB) | Evaluation results Head stain | Evaluation results Slittability | Evaluation results Durability |
|---|---|---|---|---|---|---|---|---|---|---|---|
| Example 2-1 | 1,500 | 1/1.5 | 0.54 | PEN | 4.2 | 45,000 | +0.6 | −1.4 | 5 | G | G |
| Example 2-2 | 1,660 | 1/2.0 | 0.54 | PEN | 4.2 | 45,000 | +0.5 | −1.3 | 5 | G | G |
| Example 2-3 | 1,940 | 1/2.6 | 0.54 | PEN | 4.2 | 45,000 | +0.6 | −1.0 | 5 | F | G |
| Example 2-4 | 1,400 | 1/2.0 | 0.54 | PEN | 4.2 | 45,000 | +0.5 | −1.4 | 5 | G | G |
| Example 2-5 | 1,200 | 1/2.0 | 0.54 | PEN | 4.2 | 45,000 | +0.3 | −1.5 | 5 | G | G |
| Example 2-6 | 1,250 | 1/2.0 | 0.60 | PET | 4.2 | 45,000 | +0.1 | −1.6 | 4 | G | G |
| Example 2-7 | 1,500 | 1/1 | 0.54 | PEN | 4.2 | 45,000 | 0 | −1.7 | 4 | G | G |
| Example 2-8 | 1,500 | 1/2.5 | 0.54 | PEN | 4.2 | 45,000 | +0.6 | −1.2 | 5 | F | G |
| Example 2-9 | 1,500 | 1/3.0 | 0.54 | PEN | 4.2 | 45,000 | +0.8 | −1.1 | 5 | F | G |
| Example 2-10 | 1,500 | 1/1.5 | 0.50 | PEN | 4.2 | 45,000 | +0.2 | −1.4 | 5 | G | F |
| Example 2-11 | 1,500 | 1/1.5 | 0.60 | PEN | 4.2 | 45,000 | +0.4 | −1.2 | 5 | F | G |
| Example 2-12 | 1,500 | 1/1.5 | 0.54 | PEN | 3.0 | 45,000 | +0.5 | −1.3 | 5 | G | G |
| Example 2-13 | 1,500 | 1/1.5 | 0.54 | PEN | 4.2 | 45,000 | +0.5 | −1.2 | 4 | G | G |
| Example 2-14 | 1,500 | 1/1.5 | 0.54 | PEN | 4.2 | 31,000 | +0.4 | −1.4 | 4 | G | G |
| Example 2-15 | 1,500 | 1/1.5 | 0.54 | PEN | 4.2 | 59,000 | +0.2 | −1.2 | 5 | G | G |
| Comparative Example 2-1 | 1,100 | 1/1.5 | 0.54 | PEN | 4.2 | 45,000 | −0.4 | −2.2 | 3 | G | F |
| Comparative Example 2-2 | 1,150 | 1/1.5 | 0.60 | PET | 4.2 | 45,000 | −0.4 | −2.2 | 4 | G | F |
| Comparative Example 2-3 | 1,500 | 2.0/1 | 0.54 | PEN | 4.2 | 45,000 | −0.5 | −2.7 | 5 | G | F |
| Comparative | 1,500 | 1/3.5 | 0.54 | PEN | 4.2 | 45,000 | +0.9 | −2.5 | 5 | F | G |

TABLE 2-continued

| | Young's modulus | | Intr. | Kind of | Polyurethane | | Evaluation results | | | | |
|---|---|---|---|---|---|---|---|---|---|---|---|
| | | | | | Content of components with M.W. | | Output | RF flatness | Head | Slitta- | Durab- |
| Example No. | MD + TD | MD/TD | visc. | base | ≤5,000 (%) | M.W. | (dB) | (dB) | stain | bility | ility |
| Example 2-4 Comparative Example 2-5 | 11500 | 1/1.5 | 0.48 | PEN | 4.2 | 45,000 | 0 | −2.2 | 5 | G | P |
| Comparative Example 2-6 | 1,500 | 1/1.5 | 0.65 | PEN | 4.2 | 45,000 | +0.7 | −1.3 | 5 | P | G |
| Comparative Example 2-7 | 1,500 | 1/1.5 | 0.54 | PEN | 5.0 | 45,000 | +0.5 | −1.1 | 2 | P | G |
| Comparative Example 2-8 | 1,500 | 1/1.5 | 0.54 | PEN | 6.2 | 45,000 | +0.4 | −1.1 | 2 | P | G |
| Comparative Example 2-9 | 1,500 | 1/1.5 | 0.54 | PEN | 4.2 | 28,000 | +0.7 | −1.0 | 2 | G | G |
| Comparative Example 2-10 | 1,500 | 1/1.5 | 0.54 | PEN | 4.2 | 62,000 | −0.6 | −1.3 | 5 | G | G |

TABLE 3

| | Young's modulus | | Intr. | Kind of | Polyurethane | | Evaluation results | | | | |
|---|---|---|---|---|---|---|---|---|---|---|---|
| | | | | | Content of components with M.W. | | Output | RF flatness | Head | Slitta- | Durab- |
| Example No. | MD + TD | MD/TD | visc. | base | ≤5,000 (%) | M.W. | (dB) | (dB) | stain | bility | ility |
| Example 3-1 | 1,500 | 1/1.5 | 0.54 | PEN | 4.2 | 45,000 | +0.4 | −1.4 | 5 | G | G |
| Example 3-2 | 1,660 | 1/2.0 | 0.54 | PEN | 4.2 | 45,000 | +0.4 | −1.3 | 5 | G | G |
| Example 3-3 | 1,940 | 1/2.6 | 0.54 | PEN | 4.2 | 45,000 | +0.6 | −1.0 | 5 | F | G |
| Example 3-4 | 1,400 | 1/2.0 | 0.54 | PEN | 4.2 | 45,000 | +0.5 | −1.4 | 5 | G | G |
| Example 3-5 | 1,200 | 1/2.0 | 0.54 | PEN | 4.2 | 45,000 | +0.1 | −1.5 | 5 | G | G |
| Example 3-6 | 1,250 | 1/2.0 | 0.60 | PET | 4.2 | 45,000 | +0.1 | −1.7 | 5 | G | G |
| Example 3-7 | 1,500 | 1/1 | 0.54 | PEN | 4.2 | 45,000 | +0.1 | −1.7 | 4 | G | G |
| Example 3-8 | 1,500 | 1/2.5 | 0.54 | PEN | 4.2 | 45,000 | +0.6 | −1.0 | 4 | F | G |
| Example 3-9 | 1,500 | 1/3.0 | 0.54 | PEN | 4.2 | 45,000 | +0.7 | −1.1 | 4 | F | G |
| Example 3-10 | 1,500 | 1/1.5 | 0.50 | PEN | 4.2 | 45,000 | +0.3 | −1.7 | 4 | G | F |
| Example 3-11 | 1,500 | 1/1.5 | 0.60 | PEN | 4.2 | 45,000 | +0.6 | −1.1 | 5 | F | G |
| Example 3-12 | 1,500 | 1/1.5 | 0.54 | PEN | 3.0 | 45,000 | +0.5 | −1.3 | 5 | G | G |
| Example 3-13 | 1,500 | 1/1.5 | 0.54 | PEN | 4.2 | 45,000 | +0.4 | −1.3 | 4 | G | G |
| Example 3-14 | 1,500 | 1/1.5 | 0.54 | PEN | 4.2 | 31,000 | +0.6 | −1.3 | 3 | G | G |
| Example 3-15 | 1,500 | 1/1.5 | 0.54 | PEN | 4.2 | 59,000 | +0.3 | −1.4 | 5 | G | G |
| Comparative Example 3-1 | 1,100 | 1/1.5 | 0.54 | PEN | 4.2 | 45,000 | −0.5 | −2.3 | 3 | G | F |
| Comparative Example 3-2 | 1,150 | 1/1.5 | 0.60 | PET | 4.2 | 45,000 | −0.5 | −2.2 | 4 | G | F |
| Comparative Example 3-3 | 1,500 | 2.0/1 | 0.54 | PEN | 4.2 | 45,000 | −0.5 | −2.7 | 4 | G | F |
| Comparative Example 3-4 | 1,500 | 1/3.5 | 0.54 | PEN | 4.2 | 45,000 | +0.7 | −2.3 | 4 | F | G |
| Comparative Example 3-5 | 1,500 | 1/1.5 | 0.48 | PEN | 4.2 | 45,000 | −0.1 | −2.2 | 4 | G | P |
| Comparative Example 3-6 | 1,500 | 1/1.5 | 0.65 | PEN | 4.2 | 45,000 | +0.7 | −1.2 | 4 | P | G |
| Comparative Example 3-7 | 1,500 | 1/1.5 | 0.54 | PEN | 5.0 | 45,000 | +0.5 | −1.1 | 3 | P | G |
| Comparative Example 3-8 | 1,500 | 1/1.5 | 0.54 | PEN | 6.2 | 45,000 | +0.4 | −1.2 | 2 | P | G |
| Comparative Example 3-9 | 1,500 | 1/1.5 | 0.54 | PEN | 4.2 | 28,000 | +0.7 | −1.0 | 1 | G | G |
| Comparative Example 3-10 | 1,500 | 1/1.5 | 0.54 | PEN | 4.2 | 62,000 | −0.6 | −1.2 | 5 | G | G |

As is apparent from the results of Tables 1, 2 and 3, the examples of the present invention satisfy all of output, RF flatness, head stain, slittability and durability, but the comparative examples don't satisfy at least any one of these requirements.

While the invention has been described in detail and with reference to specific embodiments thereof, it will be apparent to one skilled in the art that various changes and modifications can be made therein without departing from the spirit and scope thereof.

What is claimed is:

1. A magnetic recording medium having a total thickness of not more than 11 μm comprising a non-magnetic support having a magnetic layer comprising a Fe—Co ferromagnetic metal powder containing Al and Y, wherein the powder is dispersed in a binder provided on a first surface of said non-magnetic support and a back layer provided on a second surface of said non-magnetic support, wherein said non-magnetic support has a longitudinal Young's modulus ($E_{MD}$) and a crosswise Young's modulus ($E_{TD}$) such that the sum of $E_{MD}$ and $E_{TD}$ is not less than 1,200 kg/mm$^2$ and the ratio of $E_{MD}$ to $E_{TD}$ is from 1:1 to 1:3 and wherein an intrinsic viscosity of the non-magnetic support is from 0.50 to 0.60 and said magnetic layer comprises a polyurethane resin with a weight-average moleuclar weight of from 30,000 to 60,000 wherein the polyurethane resin comprises not more than 4.5% by weight of the polyurethane resin of a component having a molecular weight less than 5,000.

2. The magnetic recording medium as in claim 1, wherein said non-magnetic support has an intrinsic viscosity of from 0.52 to 0.55.

3. The magnetic recording medium as in claim 1, wherein said polyurethane resin has a weight-average molecular weight of from 35,000 to 50,000.

4. The magnetic recording medium as in claim 1, wherein said non-magnetic support is a polyethylene naphthalate.

5. The magnetic recording medium as in claim 1, wherein said sum of $E_{MD}$ and $E_{TD}$ is from 1,400 to 2,000 kg/mm$^2$.

6. The magnetic recording medium as in claim 1, wherein said polyurethane resin contains at least one polar group selected from the group consisting of —SO$_3$M, —OSO$_2$M, —OSO$_3$M, —COOM, —OPO(OM)$_2$ and —PO(OM)$_2$ wherein M represents H, Li, Na, K, ammonium or alkyl group.

7. The magnetic recording medium as in claim 1, wherein said polyurethane resin is contained in an amount of from 15 to 50% by weight based on the total weight of the binders.

8. The magnetic recording medium as in claim 1, wherein said polyurethane resin is used in combination with a vinyl chloride copolymer having in its side chain at least one polar group selected from the group consisting of —SO$_3$M, —OSO$_2$M, —OSO$_3$M, —COOM, —OPO(OM)$_2$ and —PO(OM)$_2$ wherein M represents H, Li, Na or K).

9. The magnetic recording medium as in claim 1, wherein said ferromagnetic powder is a ferromagnetic metal powder containing at least one selected from the group consisting of iron, cobalt and nickel.

10. The magnetic recording medium as in claim 1, wherein said ferromagnetic powder has a specific surface area of from 40 m$^2$/g to 80 m$^2$/g.

11. The magnetic recording medium as in claim 1, wherein said magnetic layer and back layer comprise a carbon black having a size of from 10 to 100 mμ.

* * * * *